(12) United States Patent
Rozenberg et al.

(10) Patent No.: US 12,554,842 B2
(45) Date of Patent: Feb. 17, 2026

(54) MALWARE DETECTION IN CONTAINERIZED ENVIRONMENTS

(71) Applicant: INTERNATIONAL BUSINESS MACHINES CORPORATION, Armonk, NY (US)

(72) Inventors: Boris Rozenberg, Ramat Gan (IL); Yehoshua Sagron, Haifa (IL); Lev Greenberg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 17/809,586

(22) Filed: Jun. 29, 2022

(65) Prior Publication Data

US 2024/0004993 A1 Jan. 4, 2024

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
See application file for complete search history.

(56) References Cited

U.S. PATENT DOCUMENTS

| | | | |
|---|---|---|---|
| 7,069,594 B1 * | 6/2006 | Bolin | G06F 21/57 726/26 |
| 8,375,450 B1 * | 2/2013 | Oliver | G06F 21/564 713/181 |
| 9,794,287 B1 | 10/2017 | Koster | |
| 10,397,255 B1 * | 8/2019 | Bhalotra | H04L 63/1425 |
| 10,607,011 B1 * | 3/2020 | Orhan | G06F 21/566 |
| 2015/0295945 A1 * | 10/2015 | Canzanese, Jr. | G06F 21/55 726/23 |
| 2016/0173516 A1 * | 6/2016 | Raugas | G06N 7/01 726/23 |
| 2017/0063890 A1 | 3/2017 | Muddu | |
| 2017/0251003 A1 * | 8/2017 | Rostami-Hesarsorkh | G06N 5/01 |

(Continued)

FOREIGN PATENT DOCUMENTS

CN 112905421 A 6/2021

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Carl G Colin
*Assistant Examiner* — Zhe Liu
(74) *Attorney, Agent, or Firm* — Andre L. Adkins

(57) ABSTRACT

A method, computer system, and a computer program for malware detection in containerized environments are provided. The method may include monitoring operation of a container image by receiving a plurality of system calls performed during the operation of the container image. The method further includes comparing the plurality of system calls to prior container behavior associated with previous operation of a prior container image, and identifying a deviation from the prior container behavior. The method further includes isolating a subset of the plurality of system calls and classifying the subset to a malware class of a plurality of malware classes.

20 Claims, 8 Drawing Sheets

(56) References Cited

U.S. PATENT DOCUMENTS

| | | | |
|---|---|---|---|
| 2017/0262633 A1 | 9/2017 | Miserendino | |
| 2019/0163901 A1* | 5/2019 | Tien | G06F 21/552 |
| 2020/0162483 A1* | 5/2020 | Farhady | G06N 3/08 |
| 2020/0193016 A1* | 6/2020 | Zeng | G06F 11/301 |
| 2020/0296117 A1* | 9/2020 | Karpovsky | G06F 21/577 |
| 2021/0105613 A1* | 4/2021 | San Miguel | H04W 12/63 |
| 2021/0117544 A1* | 4/2021 | Kurtz | G06F 21/566 |
| 2021/0263779 A1* | 8/2021 | Haghighat | G06F 11/3495 |
| 2022/0129551 A1* | 4/2022 | Collier | G06F 21/565 |
| 2022/0292196 A1* | 9/2022 | Bhagi | G06F 21/554 |
| 2023/0028394 A1* | 1/2023 | El-Moussa | G06F 21/562 |
| 2023/0090689 A1* | 3/2023 | Knierim | G06F 21/53 |
| 2023/0105087 A1* | 4/2023 | Borges | G06N 20/20 726/23 |
| 2023/0124166 A1* | 4/2023 | Mohanty | G06N 20/20 726/22 |

OTHER PUBLICATIONS

Tunde-Onadele, "A Study on Container Vulnerability Exploit Detection," 2019 IEEE International Conference on Cloud Engineering (IC2E), IEEE Xplore, pp. 121-126, <https://ieeexplore.ieee.org/search/searchresult.jsp?newsearch=true&queryText=A%20Study%20on%20Container%20Vulnerability%20Exploit%20Detection>.

Zhang, et al., "A Real-time Intrusion Detection System Based on OC-SVM for Containerized Applications," 2021 IEEE 24th International Conference on Computational Science and Engineering (CSE 2021), IEEE Xplore, pp. 138-145, <https://ieeexplore.ieee.org/search/searchresult.jsp?newsearch=true&queryText=A%20real-time%20intrusion%20detection%20system%20based%20on%20OC-SVM%20for%20containerized%20applications>.

* cited by examiner

MALWARE DETECTION IN CONTAINERIZED ENVIRONMENTS

FIELD OF THE INVENTION

The present disclosure relates to computer security, and more specifically, to anomaly and threat detection in microservice computing environments.

BACKGROUND

Anomaly and threat prevention and detection are generally of significant concern when pertaining to computer security and operations. In particular, active inspection of files, networks, and processes within a system searching for malware or malicious software reduces the likelihood of infectious code compromising the system in real-time.

Moreover, large distributed systems are allocated across containers via container orchestration technologies in which the containers virtualize operating system functionality.

SUMMARY

Additional aspects and/or advantages will be set forth in part in the description which follows and, in part, will be apparent from the description, or may be learned by practice of the invention.

A malware detection method, system, and computer program for containerized environments is provided. The method includes monitoring, via a computing device, operation of a container image, the monitoring comprising receiving a plurality of system calls performed during the operation of the container image; comparing, via the computing device, the plurality of system calls to prior container behavior associated with previous operation of the container image; identifying, via the computing device, a deviation from the prior container behavior; and in response to identifying the deviation, isolating, via the computing device, a subset of the plurality of system calls and classifying the subset to a malware class of a plurality of malware classes including a confidence level.

According to some embodiments, the method further includes generating an alert to notify of potential malware and at least one malware class of the plurality of malware classes in response to identifying the confidence level exceeding a pre-determined threshold.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
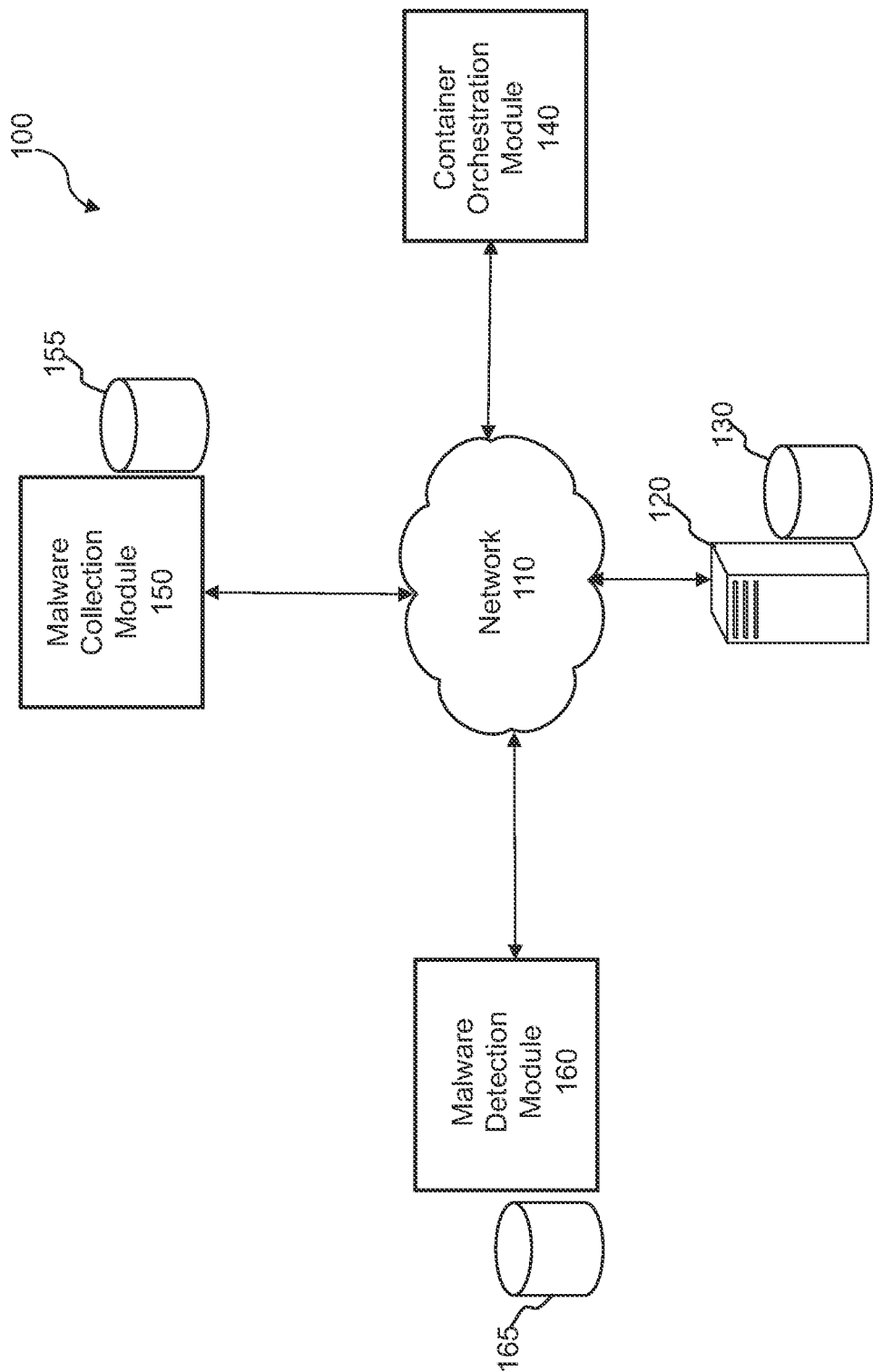
FIG. 1 illustrates a functional block diagram illustrating a malware detection environment according to at least one embodiment.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a method, computer system, and computer program product for malware detection in containerized environments. Malware, ransomware, and other applicable security anomalies pose a significant threat to computer systems. Tactics such as machine learning for analysis of security anomalies have been utilized to circumvent exposure and vulnerability; however, both static and dynamic approaches have their various setbacks. For example, approaches involving static analysis of security anomalies such as image analysis and policy-based detection fail to account for adapting to changing behaviors within the applicable system (e.g., new malwares which has not been encountered before, and cannot be actively searched for), and approaches involving dynamic analysis of security anomalies result in high false positive rates in which system instances/activities are misclassified as security anomalies. In addition, dynamic analysis of security anomalies such as malware may require extraction of features derived from components of the system in order to accurately detect malware in which the detection is based upon a confidence score relative to maliciousness. Classification methods applied directly on all logged operations are generally effected by noise problems that impact classifying accuracy. The present embodiments have the capacity to detect malware within containerized environments in a manner that circumvents the aforementioned issues via vectorizing extracted features across containers by shrinking file paths and process paths utilizing optimal data structures, isolating processes identified within detected anomalies for determination of data subsets that deviate from normal activity within the containerized system, and classifying the data subsets as malware or benign; thus, reducing the malware false positive rate rendering malware detection within containerized environments feasible.

Referring now to FIG. 1, an environment for malware detection in containerized environments 100 is depicted according to an exemplary embodiment. FIG. 1 provides only an illustration of implementation and does not imply any limitations regarding the environments in which different embodiments may be implemented. Modifications to environment 100 may be made by those skilled in the art without departing from the scope of the invention as recited by the claims. In some embodiments, environment 100 includes a server 120 communicatively coupled to a database 130, a container orchestration module 140, a malware collection module 150, a malware classifications database 155 communicatively coupled to malware collection module 150, a malware detection module 160, and an anomaly detection database 165 communicatively coupled to malware detection module 160, each of which are communicatively coupled over a network 110. Network 110 may include various types of communication networks, such as a wide area network (WAN), local area network (LAN), a telecommunication network, a wireless network, a public switched network and/or a satellite network, cloud networks, etc. Some clouds are based upon non-traditional IP networks. Thus, for example, a cloud may be based upon two-tier CLOS-based networks with special single layer IP routing using hashes of MAC addresses. The techniques described herein may be used in such non-traditional clouds. In some embodiments, network 110 may be embodied as a physical network and/or a virtual network. A physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network. It should be appreciated that FIG. 1 provides only an illustration of one implementation and does not imply any limitations with regard to the environments in which different embodiments may be implemented. Many modifications to the depicted environments may be made based on design and implementation requirements.

In some embodiments, server 120 is configured to generate a centralized platform configured to allow users to view, add, and/or edit applicable data received by server 120 over network 110 from any applicable module described herein. For example, users may view the resulting false positive rate of the security anomalies detected within environment 100. As described herein, malware may incorporate any security anomalies including but not limited to trojans, ransomware, polymorphic malware, rootkits, keyloggers, bots, spyware/adware, viruses, worms, suspicious activity, or any other applicable security anomalies known to those of ordinary skill in the art. In some embodiments, container orchestration module 140 manages "pods" which are configured to be applied to management of computing-intensive large scale task applications in network 110. For example, pods may function as groups of containers (e.g., rkt container, runc, OCI, etc.) that share network 110 along with computing resources of environment 100 for the purpose of hosting one or more application instances. In an alternative embodiment, container orchestration module 140 may manage a plurality of virtual machine pods, namespace pods, or any other applicable type of deployable objects known to those of ordinary skill in the art. Container orchestration module 140 takes one or more images that contain applications, respective dependencies, and a small Operating System (OS) distribution in a layered filesystem, and it creates a process within its own namespaces on a hardware node. In some embodiments, container orchestration module 140 includes at any applicable container orchestration system for automation of efforts to execute containerized workloads and services, including automation of software deployment in cloud environments, scale of software in cloud environments, and management of software in cloud environments.

Malware collection module 150 is configured to run a plurality of malwares derived from a plurality of families, and tracks system calls relating to files, network, and processes of the pods operated by container orchestration module 140, performs feature-selection and train a classifier that given a vector representation of a program within container orchestration module 140, to classify it as benign or malicious. The classification can also include the malware family along with confidence. It should be noted that the one or more models may be summarizations of the behavior associated with one or more container images. For example, interactions between the container images and the filesystems, processes, and/or network may be reflected in the one or more models. However, it should be noted that one of the purposes of malware collection module 150 is to efficiently collect a plurality of malware features and/or malware-related features derived from the system calls, in which the system calls may be encoded into the one or more models. The collection of malware features is initiated by malware collection module 150 monitoring all applicable invoked system calls and selecting those that pertain to files, network, and processes related to the container images and/or associated sources thereof. Continuous monitoring of the operations of the container image allows a plurality of system calls performed during operation of the container image to be collected and recorded. One purpose of malware collection module 150 is to assist malware detection module 160 by creating feature candidates via selecting accessed file paths, creating process paths, and source/destination ports. In some embodiments, malware collection module 150 is designed to shrink file paths and process paths in a manner in which each resulted feature will be frequent across the plurality of malwares classes based on predefined parameters. Malware collection module 150 distinguishes between infectious programs and benign programs by utilizing at least one subset of data used to train the one or more models in order to identify features indicative of benign software. The malware features support malware detection module 160 comparing the plurality of system calls to prior behavior associated with container image operations. For example, extraction of malware features may be accomplished via malware collection module 150 running malware separately across a plurality of malware classes in which malware collection module 150 effectively records and generalizes the plurality of systems calls allowing malware collection module 150 to apply various mechanisms disclosed herein to filter out system calls common for benign software. In some embodiments, extraction of malware features is performed offline in which the malware features are configured to be stored in anomaly detection database 165.

Malware detection module 160 is designed to identify deviations from learned behavior associated with the one or more models in real-time, in which each deviation is a suspicious event/activity. In some embodiments, malware detection module 160 identifies deviations by assigning vectors of suspicious activity (hereinafter "deviation vectors") in which the vectors are binary and represent operations the container image has done before and operations the container image has not done before. Malware detection module 160 identifies deviations in which deviations as described herein are elements of the behavior of a program that may be classified via vectorization. In some embodiments, malware detection module 160 determines which files and/or directories of the container image are desired to be processed, the amount of network communication necessary, system call configurations, etc.

It should be noted that classification of malware features is necessary for malware detection module 160 to identify deviations due to the fact that some deviations may be considered "regular" deviations in that they are derived from stable behaviors that ultimately contribute to the false positive rate. Classification of the malware features allows representation of container image behavior as malware feature vectors providing distinction between that which is malware and that which is benign. In some embodiments, malware collection module 150 may generate one or more clusters of the malware feature vectors which supports filtration of the benign features from the malicious features. However, identifying deviations requires malware detection module 160 utilizing an isolation process in order to isolate each suspicious process, along with associated processes, derived from the operations of the container image. Continuous processing by malware collection module 150 and malware detection module 160 allows the development of an accumulating run-time profile relating to the monitored behavior of the containers derived from container orchestration module 140. The run time profile is designed to represent patterns that appear in both the plurality of malware and the monitored application associated with the applicable containers derived from container orchestration module 140.

Figure 2:
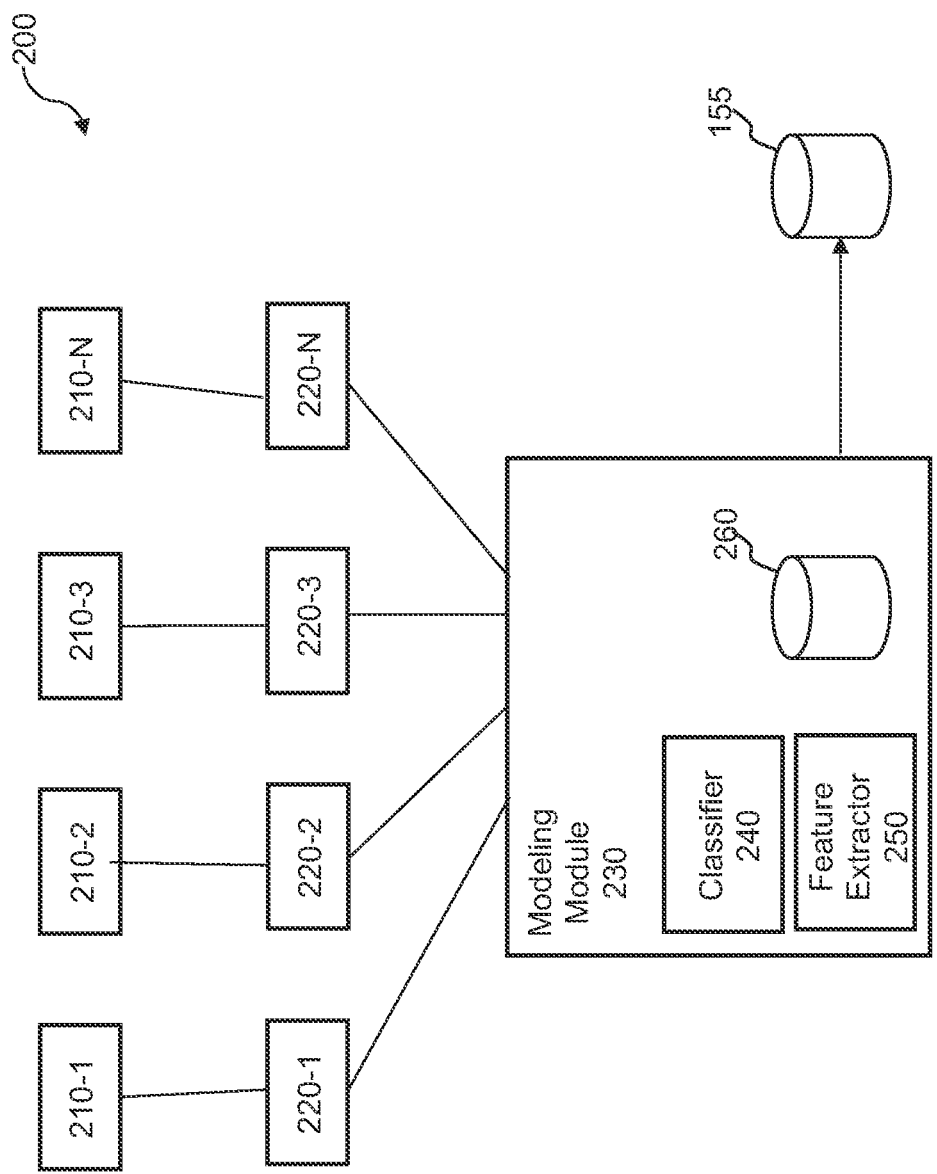
FIG. 2 depicts an example system configuration of malware feature extraction and classification according to at least one embodiment.

Referring now to FIG. 2, a malware feature extraction and classification system configuration 200 is depicted, according to an exemplary embodiment. Configuration 200 includes a plurality of executing software application 210-1, 210-2, up to 210-N (collectively 210, hereinafter referred to as "applications") of container orchestration module 140 including a plurality of filesystems, processes, and/or networks 220-1, 220-2, up to 220-N (collectively 220, hereinafter referred to as "files") including files, folders, metadata, tables, and any other applicable data structure and/or data known to those of ordinary skill in the art. Configuration 200 further includes a modeling module 230 communicatively coupled to server 120, container orchestration module 140, malware collection module 150, and/or malware detection module 160. Modeling module 230 includes a classifier 240, a feature extractor 250 communicatively coupled to malware collection module 150, and a feature database 260 communicatively coupled to classifier 240. It should be noted that modeling module 230 is a machine learning module configured to use one or more heuristics and/or machine learning based models for performing one or more of the various aspects as described herein. In some embodiments, the machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure.

In a preferred embodiment, a plurality of system calls that impact the process lifecycle and/or interact with applications 210 and files 220 of the applicable executing container image are analyzed by malware collection module 150 allowing modeling module 230 to embed a sequence of system calls derived from the plurality of system calls into one or more machine learned models. In some embodiments, the applicable model processing the sequence of system calls is compared to a behavior model generated by modeling module 230, in which the behavior model is generated from container images of container orchestration module 140 associated with applications 210 and files 220. The purpose of the behavior model is to not only provide a reference metric for behavior within containers, but also to support system call telemetry analysis of containers. It should be noted that the one or more models generated my modeling module 230 may include various datasets and be utilized for various purposes. Outputs of one model may be utilized as a source of training data for another model, and deploying of models may support testing in a controlled environment before being deployed in a public setting for model optimization and system calls filtration purposes. Furthermore while malware collection module 150 is performing the monitoring of system calls, sets of byte codes ("n-grams") or the relative frequency of occurrence of key byte-patterns relating to malware are continuously being identified via iterations of modeling module 230 and stored in anomaly detection database 165 for the purpose of training classifier 240.

Modeling module 230 assists malware collection module 150 in generating sets of malware features $F_{1-N}$ frequent for the plurality of malwares associated with the containers. For example, training data sets are derived from files 220 if not already within anomaly detection database 165 and the one or more models are derived from the training data sets in order to ascertain sets of malware and benign software components via classifier 240. In some embodiments, modeling module 230 defines classifier 240 based on data within anomaly detection database 165 and utilizes classifier 240 to classify sets of malware and benign software components categorically into a specific class of a plurality of malware classes $C_{1-N}$. The plurality of malware classes are outputs of the classification model and may be predefined via server 120 and/or may be ascertained from outputs of the one or more models derived from iterations performed by modeling module 230, such as but not limited to a classification model associated with classifier 240. In some embodiments, classifier 240 receives the malware feature vectors for the purpose of applying one of the plurality of malware classes, or a benign class if applicable, to each of the malware feature vectors and assigning a confidence to the malware feature vectors in which the confidence may be an output of classifier 240.

While malware collection module 150 is actively monitoring applications 210 and files 220 and modeling module 230 is performing iterations, malware collection module 150 is creating malware feature vectors by selecting all accessed file paths, created process paths, sources, and destination ports ascertainable from applications 210 and files 220, and compressing the plurality of system calls of the monitored container image into the run-time profile. The shrinking of components of the operations of the container image is performed by malware collection module 150 being configured to shrink file paths and processes of applications 210 and files 220 in a manner in which each resulting malware feature is frequent across the plurality of malwares based on the predefined parameter. Traditionally, creation of feature candidates using various selection approaches naturally results in overfitting which would result in an abundant amount of false negatives. In order to circumvent this issue, malware collection module 150 performs the aforementioned technique based on predefined parameters. The predefined parameters may be established via server 120 (e.g., user inputs on the centralized platform) or derived from outputs of the one or more models.

In some embodiments, malware collection module 150 performs filtration, feature selection, and clustering of the malware feature vectors through various cognitive operations such as, a frequency distribution of terms and key concepts using term-frequency-inverse document frequency (e.g., "Tf-idf") vectors, and/or other term vector based similarity operations. A Tf-idf is an operation that measures an importance of words in files 220. The Tf-idf is a numerical statistic that is intended to reflect how important a word is to applications 210 and files 220. In particular, malware collection module 150 performs clustering of the malwares based on the one or more similarities wherein the one or more similarities can be determined in terms of multiple measures including but not limited to Euclidean distance, Manhattan distance, dynamic time warping (DTW) distance, Minkowski Distance, Cosine distance, Correlation coefficients (e.g. Pearson, Spearman), or any other applicable similarity measure known to those of ordinary skill in the art. The choice of similarity measure generally depends on where clustering is applied. The clustering of malware may include one or more of K-means clustering or other centroid based clustering model, hierarchical clustering, distribution clustering models, density based clustering models such as, e.g., DBSCAN or OPTICS, HCS clustering, or neural network based models such as, e.g., self-organizing maps, or any other suitable clustering model. Malware collection module 150 utilizes feature extractor 150 to perform feature selection on the clusters utilizing Tf-idf, which results in removal of features that are not only frequent across benign programs, but also features that are common for all of the clusters (e.g., IDF=0). It should be noted that a feature common for all of the clusters indicates that it is common for all the malwares and more than likely for all programs, including benign programs. Malware collection module 150 creates a feature set including the resulting features of each cluster and stores the feature set in feature database 260, in which the feature set is a union of features that were not filtered out by the filtration and clustering performed by malware collection module 150.

Malware classes $C_{1-N}$ are stored in malware classifications database 155. In some embodiments, malware collection module 150 utilizes classifier 240 and feature extractor 250 to assist with the generation of the run-time profile based on features $F_{1-N}$ extracted by feature extractor 250 over the multiple runs. Classifier 240 analyzes the clusters generated by malware collection module 150 in order to output the proper label of at least one of the plurality of malware classes. As previously mentioned, the run-time profile designed to represent a stored profile corresponding to patterns detected within applications 210 and the plurality of malware. The malware profile provides descriptions relating to what system calls applications 210 make, what has been written of files 220, what has been read of files 220, network connections established, etc. It should be noted that malware detection module 160 utilizes the run-time profile to detect a plurality of deviations from normal behavior of the containers in addition to filtering data derived from instances of the operating container image and/or derivatives thereof. In other words, the plurality of system calls are configured to be filtered for instances of malware based upon the run-time profile.

Figure 3:
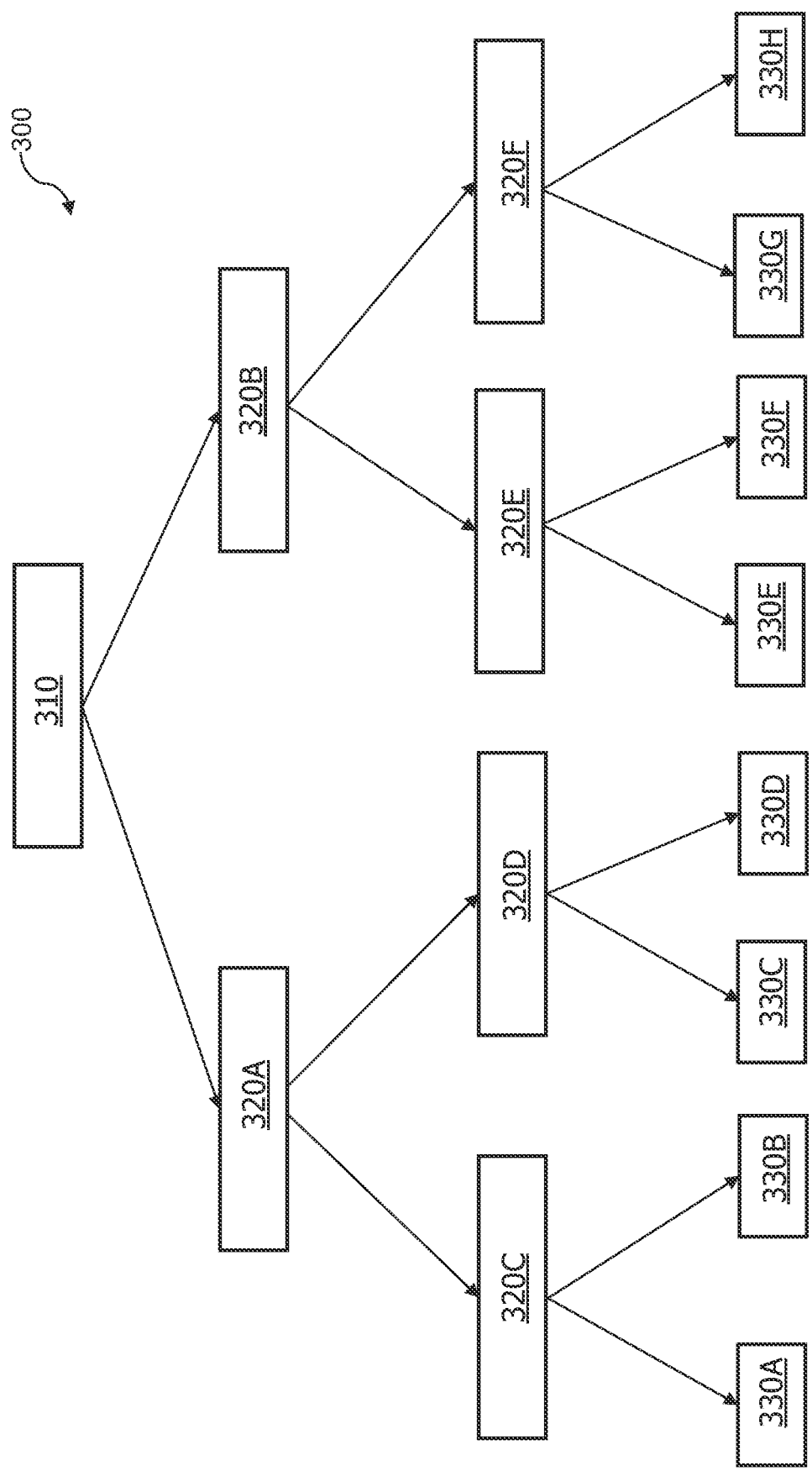
FIG. 3 depicts a simplified illustration of a malware decision tree according to at least one embodiment.

Referring now to FIG. 3, a tree 300 representing all paths associated with the plurality of malwares, according to an exemplary embodiment. Tree 300 is generated by server 120, based on instructions from malware collection module 150, in order to shrink file paths and process paths such that each of features $F_{1-N}$ will be frequent across the plurality malware classes according to the predefined parameters. Tree 300 includes a root node 310 and intermediate nodes 320A-320F each of which having descending edges. Leaves 330A-330G are depicted, in which each leaf represents a portion of applications 210, where each leaf represents those portions that follow a single path from root node 310. In some embodiments, server 120 calculates a number of malware instances for each of leaves 330A-330G. If the calculated number is less than a predefined threshold, then server 120 cuts the applicable leaf off, and repeats this process until there are no more leaves then proceeds to proximate node if applicable. It should be noted that the edges are configured to be possible continuations of the current node in which there may be no specific relevance in the direction and/or orientation of an edge.

Figure 4:
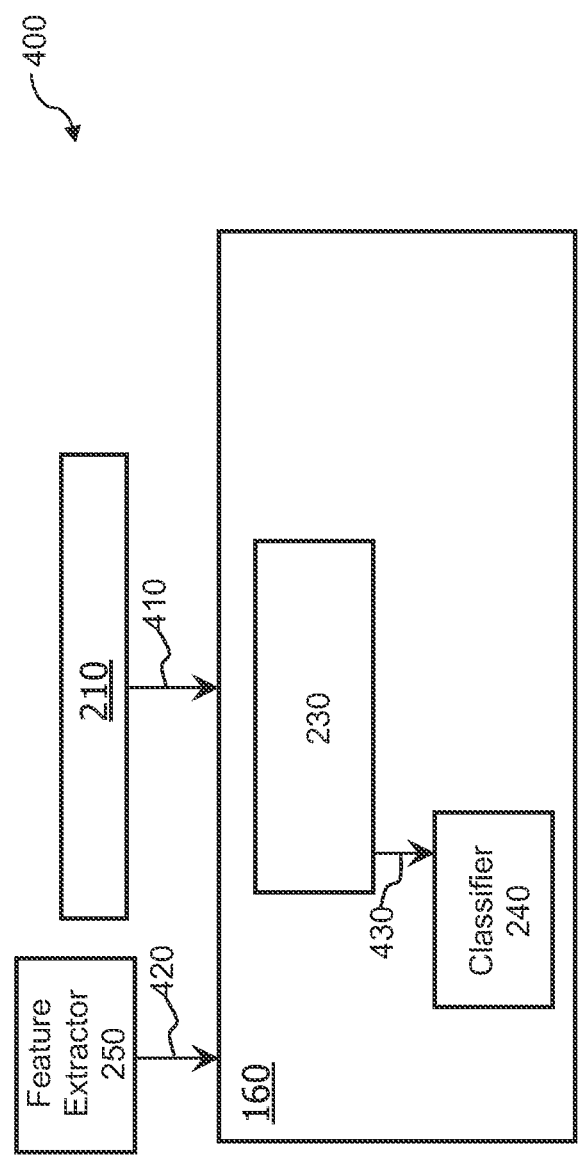
FIG. 4 illustrates an example of deviation identification of a malware detection system according to at least one embodiment.

Referring now to FIG. 4, an example of deviation identification 400 by malware detection module 160 is depicted, according to an exemplary embodiment. In this example, application 210 of the applicable container image makes a system call 410 which malware detection module 160 may analyze for detection of malware. Identification of deviations could be based on sets of concrete features of system calls or compilations of all logged operations in which the concrete features may be subsets of monitored data selected on the centralized platform (e.g., monitoring "read" operations in specific directories and detecting change within those ascertained features only). Inherently, detection of deviations results in false-positives due to complicated programs performing rare operations to handle different requirements. Malware detection module 160 handles the malware features as binary indicators in which each feature is associated with a specific set of operations. In a preferred embodiment, binary vectors represent the operations the program has performed and the operations the program has never performed; thus, the malware feature value is "True" if the program has performed the operation at least once and "False" otherwise.

In some embodiments, system call 410 is a sequence of system calls configured to be encoded in the behavior model of modeling module 230 for the purpose of creating a normal behavior associated with the running container image and/or collection of container images. However, modeling module 230 stores outputs of the one or more models in feature database 260 which is configured to be queried by feature extractor 250. Querying feature database 260 allows feature extractor 250 to perform profiling of application 210 in terms of accessed files, network connections, created processes, etc. In some embodiments, feature extractor 250 performs the profiling of application 210 in terms of features $F_{1-N}$ resulting in feature extractor 250 generating a malware profile 420 for transmission to malware detection module 160. It should be noted that malware profile 420 is stabilized based on a plurality of stabilizing parameters derived from features $F_{1-N}$, and that malware profile 420 represents the patterns that appear in both the plurality of malware and application 210.

Malware detection module 160 having malware profile 420 allows malware detection module 160 to identify a plurality of deviations 420 due to the fact that malware profile 420 not only represents what is "normal behavior" for container images of container orchestration module 140 but also what is commonly attributed to the one or more malwares based on features $F_{1-N}$. In some embodiments, plurality of deviations 430 are detected via malware detection module 160 comparing block level operations of environment 100 to the behavior model which is continuously being updated with both malicious and benign activity and in some instances suspicious activity. Detection of plurality of deviations 430 may be based on various measures including but not limited to ranges of values, bounded rationality, standard deviation, or any other applicable measurement of anomaly detection/determination known to those of ordinary skill in the art. Classifier 240 receives plurality of deviations 430 in a vector representation from malware detection module 160 in which modeling module 230 applies the label of one of malware classes $C_{1-N}$ and the confidence to each of plurality of deviations 430 as outputs of the classification model. There is a desire for classifier 240 to solely be fed $F_{1-N}$ rather than all monitored operations of the container image, in which selectivity of classifier 240 is imperative. Malware detection module 160 performs isolation of subsets of the plurality of system calls and feeds deviation vectors to classifier 240 for the purpose of classifier 240 applying malware classes $C_{1-N}$ appropriately. In some embodiments, modeling module 230 supports malware detection module 160 performing isolation by applying heuristics in order to determine applicable processes associated with the malware within the deviation vectors. In other words, all applicable processes of operations may be identified based on the particular deviation within the deviation vector. This approach allows malware detection module 160 to select a plurality of deviation features and/or deviation-related features derived from the deviation vectors. Upon isolation of the processes associated with the identified deviation, the resulting deviation features are sent to classifier 240 for classification. In some embodiments, the plurality of system calls are compared to prior container behavior associated with previous operations of the container image prior to the aforementioned isolation process, in which this prior container behavior is embodied in malware profile 420.

Figure 5:
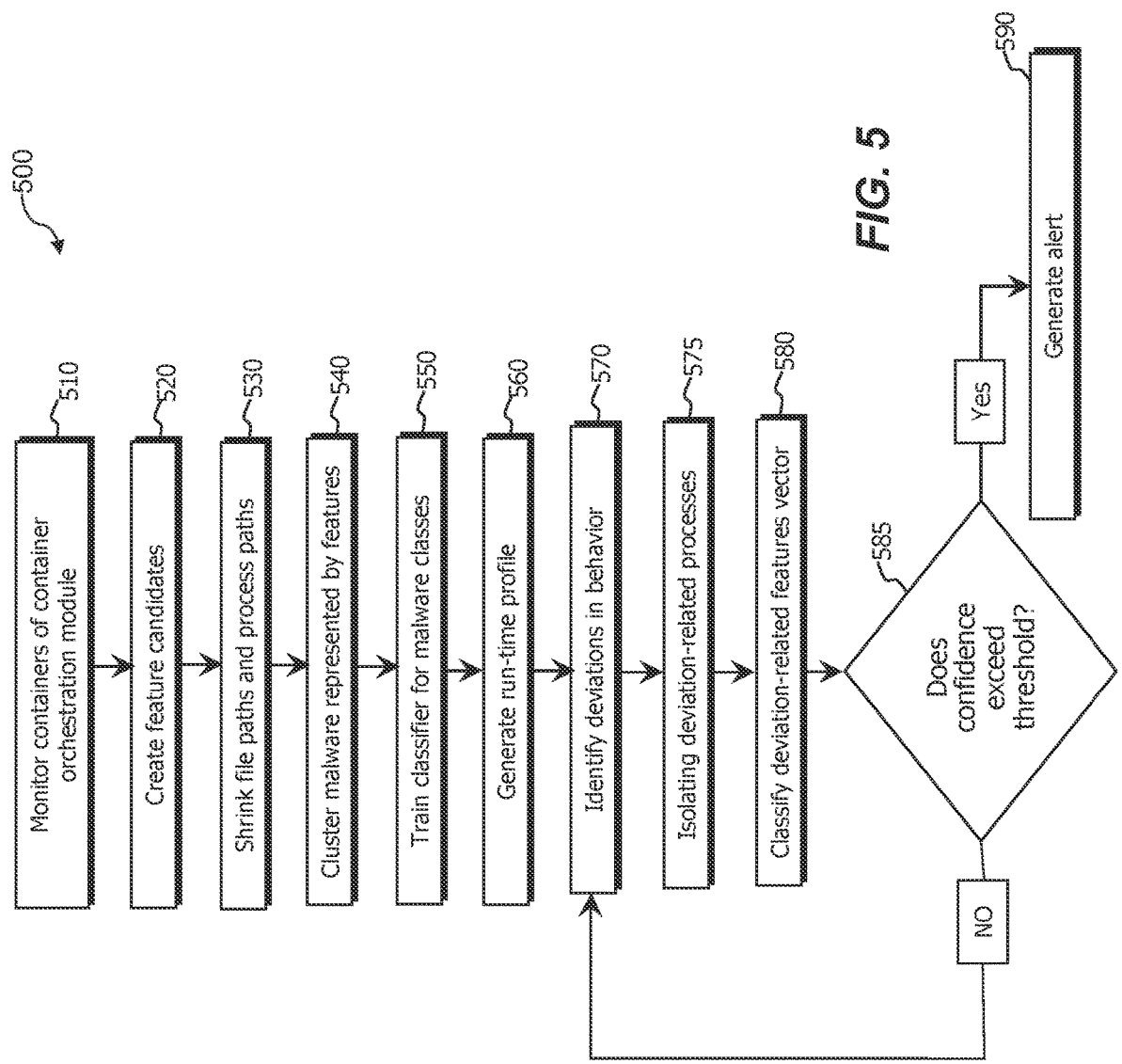
FIG. 5 illustrates a flowchart depicting a process for malware detection, in accordance with an embodiment of the invention.

With the foregoing overview of the example architecture, it may be helpful now to consider a high-level discussion of an example process. FIG. 5 depicts a flowchart 500 illustrating a computer-implemented method of malware detection, consistent with an illustrative embodiment. Process 500 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 510 of process 500, malware collection module 150 monitors container images of container orchestration module 140 in order to create a dataset of known malwares associated with the container images. It should be noted that in step 510 malware collection module 150 generates the dataset based on multiple instances in which malware collection module 150 monitors executed system calls. In some embodiments, the monitoring facilitates comparing of current container image operations to operations of a prior container image in order to detect deviations.

At step 520 of process 500, malware collection module 150 generates feature candidates associated with the plurality of malware based on the monitoring performed in step 510. In some embodiments, malware collection module 150 generates a vector of features/malware vector representing instances of any of applications 210. For example, the vector may represent program behavior and in particular the presence of malware or lack thereof, in which each entry relates to a specific system call and the applicable value associated with the entry relates to a count of how many times the specific system call was executed across a time period. The malware feature vector are ascertained by utilizing an offline process to separately run malware across multiple classes, compress the systems calls, and filter out the system calls including benign elements.

At step 530 of process 500, malware collection module 150 shrinks file paths and process paths associated with applications 210 in order to allow feature extractor 250 to begin the feature filtration process. Feature extractor 250 shrinks the file paths and process paths in a manner in which each of features $F_{1-N}$ will be frequent across malware classes $C_{1-N}$. Tree 300 of FIG. 3 depicts a preferred approach towards accomplishing proper designation of features $F_{1-N}$ across malware classes $C_{1-N}$ in a manner which reduces noise.

At step 540 of process 500, modeling module 230 performs clustering of the plurality of malware represented by the features obtained thus far. In some embodiments, feature extractor 250 filters out features frequent for the plurality of malware and for benign programs as well, in which as previously mentioned any applicable clustering, grouping, and/or TF-IDF approaches may be applied to cluster the plurality of malware. The clustering is intended to output a resulting set of features derived from the feature vector in which the output is a union of the features for each cluster that remains after the filtration process.

At step 550 of process 500, modeling module 230 trains classifier 240 in order for classifier 240 to perform classification of the malware. In some embodiments, classifier 240 receives the applicable vector as an input and maps the vector to a confidence that the input belongs to one or more malware classes $C_{1-N}$, in which malware classes $C_{1-N}$ pertain to the various malwares and/or benign programs. The classification can employ probabilistic and/or statistical-based analysis and a support vector machine (SVM) that can be an example of classifier 240 that can be employed. It should be noted that the malware feature vector is configured to be inserted into the classification model of modeling module 230 in order to map malware features $F_{1-N}$ across malware classes $C_{1-N}$. In some embodiments, the time period for monitoring and recording operations of the container image may be established by server 120 based upon malware collection module 150 indicating that there are no new system calls (e.g. no new container behavior exists) and that malware detection module 160 should terminate monitoring. It should be noted that the classification model serves the purpose of not only determining if a detected anomaly is a result of malware running on the system without relying solely on the deviation, but also continuously checking the types of suspect malware in a logging manner to wait and see if the suspected malware is finally malware.

At step 560 of process 500, server 120 and/or feature extractor 250 generates the run-time profile in order for malware detection module 160 to identify deviations from the normal behavior associated with the containers. As previously mentioned, the run-time profile is designed to represent a stored profile corresponding to patterns (e.g., behavior-related, data-related, etc.) detected within applications 210 and the plurality of malware. The run-time profile serves as a reference point specific to applications 210 based on the features. In particular, run profile allows for malware detection module 160 to detect features that are frequent in the plurality of malwares, rather than for all new activities within the respective monitored application.

At step 570 of process 500, malware detection module 160 identifies the plurality of deviations from the monitored behavior associated with the container images. In some embodiments, monitored "normal" behavior is defined as the behavior ascertained from the behavior model generated by modeling module 230. It should be noted that the deviation identification process is rooted in malware detection module 160 identifying all the processes involved directly and/or indirectly with a particular deviation. For example, a first process A configured to create a second process B, which is designed to create a third process C may each has their respective system calls. At some period of time process C executes an action that has not been previously observed. Malware detection module 160 is configured to not only ascertain the source (e.g., applicable deviation feature) of the previously unobserved operation, but also perform a concept referred to as "isolation" in which malware detection module 160 analyzes the process tree-structure in the system and decides for each process whether it is related to the current deviated process or not. All operations performed by those related processes are aggregated to build the deviation vector. For each newly identified deviation, malware detection module 160 isolates all processes related to the applicable system call that performed the deviation, and sends all the related system calls of the aforementioned processes to classifier 240. The isolation feature allows malware detection module 160 to not only isolate all system calls relevant to malware utilizing the aforementioned approaches, but also capture malware spawned from new processes based on an associated anomaly. For example, if a deviation is detected based upon deviation features then the related processes are isolated, resulting in only the operations associated with the related processes being sent in a deviation vector to the classification model.

At step 575 of process 500, malware detection module 160 isolates processes associated with and/or derived from the deviation. In light of the fact that failing to recognize the normal behavior of a system prevents marking a specific flow of operations as a deviation, malware may attempt to hide within normal acceptable operations. However, programs running within container orchestration module 140 are significantly more concrete and stable, but malware may still go undetected within this environment if reliance is based solely upon the detected deviations. Thus, malware detection module 160 relies on classifier 240 to detect malware associated with the deviations by transmitting to classifier 240 processes derived from deviations, potentially suspicious activity, and benign activity one at a time in an isolated manner. This allows for not only the reduction of noise, but also increased accuracy to malware detection.

At step 580 of process 500, the deviation vector is transmitted to classifier 240 in which classifier 240 is able to apply applicable labels and confidence based upon probability of being malicious. In addition, isolation performed by malware detection module 160 allows for iterative classification by classifier 240 resulting in labeling of malwares that includes level of propensity based upon probability. In some embodiments, optimization of applying the labels may be provided by server 120 requiring validation of classifications from users via inputs received on the centralized platform.

At step 585 of process 500, malware detection module 160 determines whether the confidence associated with the applicable malware exceeds the predetermined threshold based upon the previous mapping performed by classifier 240. In some embodiments, the confidence of the deviation is a probability of a membership of the malware in one of the clusters. The confidence is configured to be generated by classifier 240 and includes a numerical value along with an indication of whether the input to the classification model belongs to at least one of the plurality of malware classes. If malware detection module 160 determines that the confidence does not exceed a predefined confidence threshold then malware detection module 160 returns to step 570 of process 500 and continues to identify deviations from the normal behavior. Otherwise if malware detection module 160 determines that the confidence does exceed the predefined confidence threshold, then step 590 of process 500 occurs in which server 120 generates an alert configured to be presented to users via graphical interfaces on the centralized platform. In some embodiments, the alert includes information pertaining to which class of the plurality of malware classes the particular malware belongs to, in which the alerting process based upon the aforementioned steps results in a significant amount of reduction of false alerts emitted by intrusion detection systems. It should be noted that the classification model outputting a "benign" classification may account for hidden false positives as well. The alerting is based upon the confidence level exceeding the predefined confidence threshold; however, the alerting requires a malware classification from the classification model in combination with a confidence level that exceeds the predefined confidence threshold in order to reduce the amount of false positives. For example, when a program has performed an operation that is an anomaly, malware detection module 160 has ascertained that the operation is popular among the malwares, and the sub-program responsible for the deviation also performed operations that in aggregation are inherent to some malware classes/families.

Figure 6:
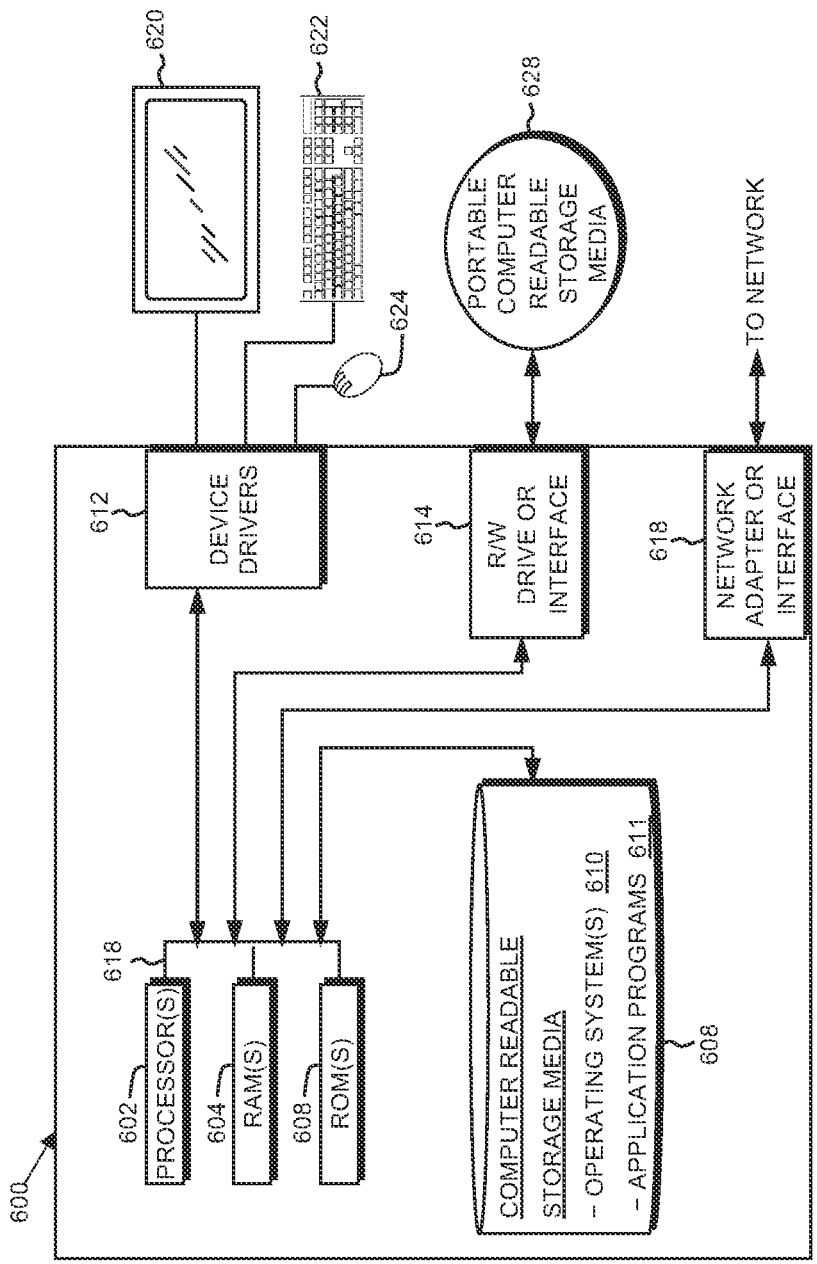
FIG. 6 depicts a block diagram illustrating components of the software application of FIG. 1, in accordance with an embodiment of the invention.

FIG. 6 is a block diagram of components 600 of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 602, 604 is representative of any electronic device capable of executing machine-readable program instructions. Data processing system 602, 604 may be representative of a smart phone, a computer system, PDA, or other electronic devices. Examples of computing systems, environments, and/or configurations that may represented by data processing system 602, 604 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices. The one or more servers may include respective sets of components illustrated in FIG. 6. Each of the sets of components include one or more processors 602, one or more computer-readable RAMs 608 and one or more computer-readable ROMs 610 on one or more buses 602, and one or more operating systems 614 and one or more computer-readable tangible storage devices 616. The one or more operating systems 614 and computing event management system 210 may be stored on one or more computer-readable tangible storage devices 616 for execution by one or more processors 602 via one or more RAMs 608 (which typically include cache memory). In the embodiment illustrated in FIG. 6, each of the computer-readable tangible storage devices 616 is a magnetic disk storage device of an internal hard drive. Alternatively, each of the computer-readable tangible storage devices 616 is a semiconductor storage device such as ROM 610, EPROM, flash memory or any other computer-readable tangible storage device that can store a computer program and digital information.

Each set of components 600 also includes a R/W drive or interface 614 to read from and write to one or more portable computer-readable tangible storage devices 608 such as a CD-ROM, DVD, memory stick, magnetic tape, magnetic disk, optical disk or semiconductor storage device. A software program, such as computing event management system 210 can be stored on one or more of the respective portable computer-readable tangible storage devices 608, read via the respective RAY drive or interface 618 and loaded into the respective hard drive.

Each set of components 600 may also include network adapters (or switch port cards) or interfaces 616 such as a TCP/IP adapter cards, wireless wi-fi interface cards, or 3G or 4G wireless interface cards or other wired or wireless communication links. Applicable software can be downloaded from an external computer (e.g., server) via a network (for example, the Internet, a local area network or other, wide area network) and respective network adapters or interfaces 616. From the network adapters (or switch port adaptors) or interfaces 616, the centralized platform is loaded into the respective hard drive 608. The network may comprise copper wires, optical fibers, wireless transmission, routers, firewalls, switches, gateway computers and/or edge servers.

Each of components 600 can include a computer display monitor 620, a keyboard 622, and a computer mouse 624. Components 600 can also include touch screens, virtual keyboards, touch pads, pointing devices, and other human interface devices. Each of the sets of components 600 also includes device processors 602 to interface to computer display monitor 620, keyboard 622 and computer mouse 624. The device drivers 612, R/W drive or interface 618 and network adapter or interface 618 comprise hardware and software (stored in storage device 604 and/or ROM 606).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
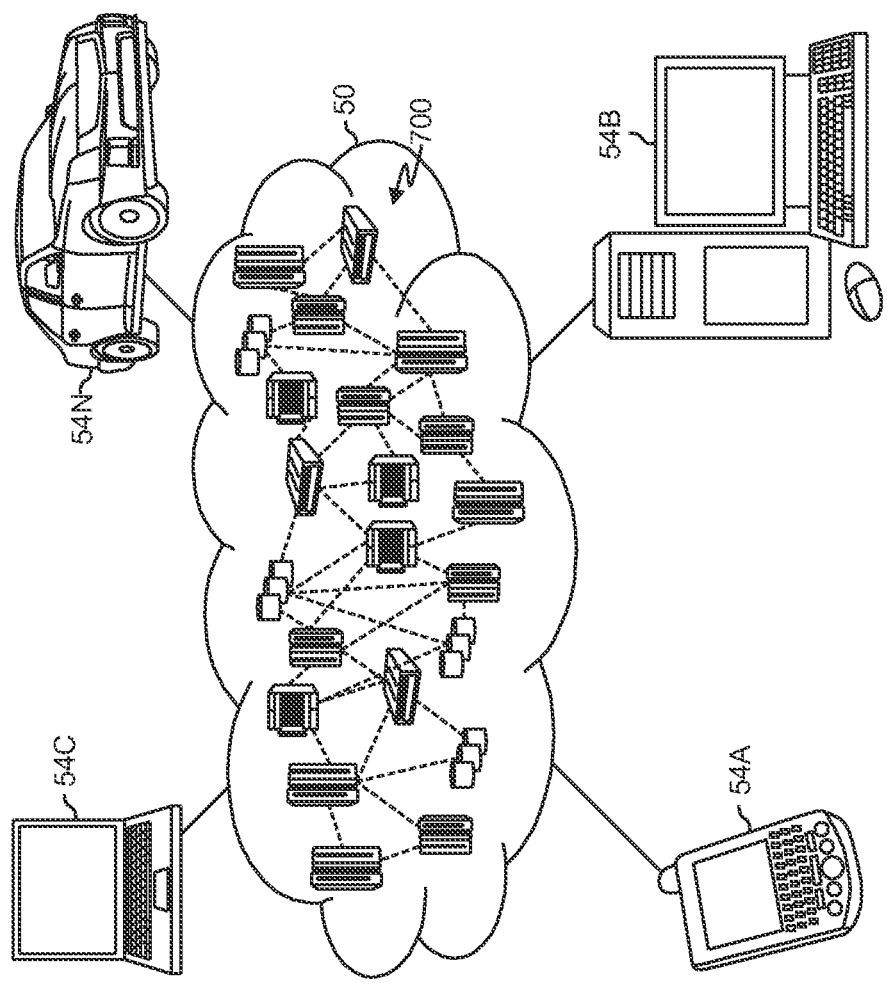
FIG. 7 depicts a cloud-computing environment, in accordance with an embodiment of the present invention.

Referring now to FIG. 7, illustrative cloud computing environment 700 is depicted. As shown, cloud computing environment 700 comprises one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 54A-N shown in FIG. 7 are intended to be illustrative only and that computing nodes 50 and cloud computing environment 700 can communicate with any type of computerized device over any type of network and/or network addressable connection (e.g., using a web browser).

Figure 8:
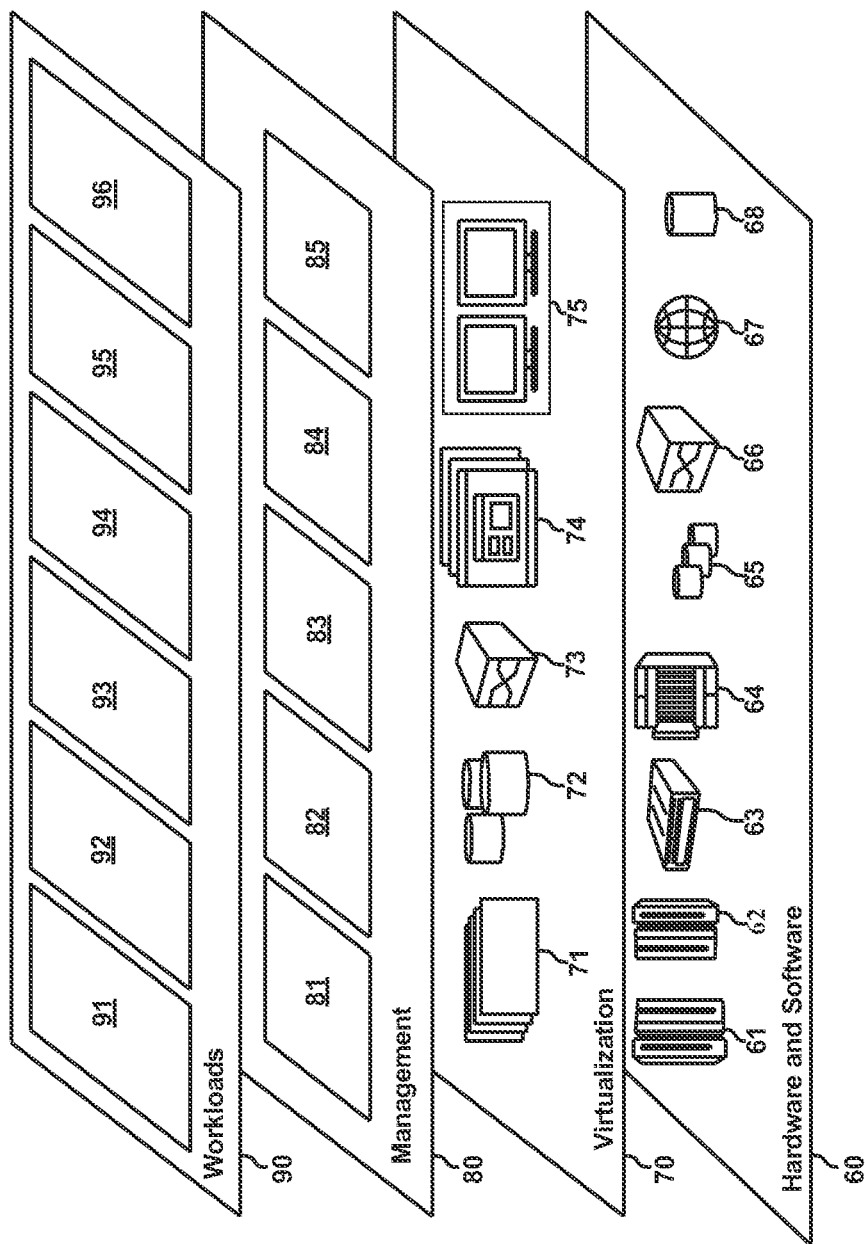
FIG. 8 depicts abstraction model layers, in accordance with an embodiment of the present invention.

Referring now to FIG. 8 a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 66 and database software 68.

Virtualization layer 60 provides an abstraction layer from which the following examples of virtual entities may be provided: virtual servers 61; virtual storage 62; virtual networks 63, including virtual private networks; virtual applications and operating systems 64; and virtual clients 65.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method of malware detection in containerized environments, the method comprising:
    monitoring, via a computing device, operation of a container image, the
    monitoring comprising receiving a plurality of system calls performed during the operation of the container image by accessing a plurality of file and process paths;
    compressing offline, via the computing device, the plurality of file and process paths into a profile based on a plurality of predefined parameters representing a plurality of malware classes;
    comparing, via the computing device, the plurality of system calls to prior container behavior associated with previous operation of a prior container image;
    identifying, via the computing device, a deviation from the prior container behavior; and
    in response to identifying the deviation, isolating, via the computing device, a subset of the plurality of system calls and classifying the subset to a malware class of the plurality of malware classes;
    wherein isolating the subset comprises a tree-structure analysis of the subset to detect a spawned malware based on an associate anomaly that is not a previously detected system call of the plurality of system calls performed during the operation of the container image and wherein the tree-structure analysis further comprises:
        filtering the benign file and process paths of the plurality of file and process paths; and
        aggregating the spawned malware into a deviation vector.

2. The computer-implemented method of claim 1, further comprising:
    in response to identifying a confidence level included in the plurality of malware classes exceeding a pre-determined threshold, generating, via the computing device, an alert to notify of potential malware and at least one malware class of the plurality of malware classes.

3. The computer-implemented method of claim 1, wherein comparing the plurality of system calls comprising:
    extracting, via the computing device, a plurality of malware-related features; wherein extracting the plurality of malware-related features comprises:
    compressing, via the computing device, the plurality of system calls into the profile; and
    filtering, via the computing device, the plurality of system calls for instances of malware based on the profile.

4. The computer-implemented method of claim 3, wherein extracting the plurality of malware-related features comprises:
    generating, via the computing device, a malware vector including the plurality of malware-related features;
    wherein the vector is compared to the prior container behavior.

5. The computer-implemented method of claim 1, wherein isolating the subset of the plurality of system calls comprises:
    identifying, via the computing device, a plurality of processes relevant to the deviation;
    selecting, via the computing device, a plurality of deviation related features derived from operations of the plurality of processes; and transmitting, via the computing device, the deviation vector including the plurality of deviation related features to a classification model.

6. The computer-implemented method of claim 5, wherein classifying the subset of the plurality of system calls further comprises:

assigning, via the classification model, the deviation vector to at least one malware class of the plurality of malware classes; and receiving, via the computing device, a confidence level associated with the deviation vector as an output of the classification model.

7. The computer-implemented method of claim 1, wherein prior container behavior comprises:

recording, via the computing device, operations of the container image based on a plurality of malware-related features for a period of time;

wherein the period of time terminates based on a determination, via the computing device, of a lack of new operations.

8. A computer program product using a computing device for malware detection in containerized environments, comprising:

one or more non-transitory computer-readable storage media and program instructions stored on the one or more non-transitory computer-readable storage media, the program instructions, when executed by the computing device, cause the computing device to perform a method comprising:

monitoring operation of a container image, the monitoring comprising receiving a plurality of system calls performed during the operation of the container image by accessing a plurality of file and process paths;

compressing offline the plurality of file and process paths into a profile based on a plurality of predefined parameters representing a plurality of malware classes;

comparing the plurality of system calls to prior container behavior associated with previous operation of a prior container image;

identifying a deviation from the prior container behavior; and in response to identifying the deviation, isolating a subset of the plurality of system calls and classifying the subset to a malware class of the plurality of malware classes;

wherein isolating the subset comprises a tree-structure analysis of the subset to detect a spawned malware based on an associate anomaly that is not a previously detected system call of the plurality of system calls performed during the operation of the container image and wherein the tree-structure analysis further comprises:

filtering the benign file and process paths of the plurality of file and process paths; and aggregating the spawned malware into a deviation vector.

9. The computer program product of claim 8, comprising instructions to further cause the computing device to perform a method comprising:

in response to identifying, a confidence level included in the plurality of malware classes exceeding a pre-determined threshold, generating an alert to notify of potential malware and at least one malware class of the plurality of malware classes.

10. The computer program product of claim 9, wherein comparing the plurality of system calls comprises instructions to further cause the computing device to perform:

extracting a plurality of malware-related features;

wherein extracting the plurality of malware-related features comprises:

compressing the plurality of system calls into the profile; and filtering the plurality of system calls for instances of malware based on the profile.

11. The computer program product of claim 10, wherein extracting the plurality of malware related features comprises instructions to further cause the computing device to perform:

generating a malware vector including the plurality of malware-related features;

wherein the vector is compared to the prior container behavior.

12. The computer program product of claim 10, wherein isolating the subset of the plurality of system calls comprises instructions to further cause the computing device to perform:

identifying a plurality of processes relevant to the deviation;

selecting a plurality of deviation related features derived from operations of the plurality of processes; and transmitting the deviation vector including the plurality of deviation related features to a classification model.

13. The computer program product of claim 12, wherein classifying the subset of the plurality of system calls comprises instructions to further cause the computing device to perform:

assigning, via the classification model, the deviation vector to at least one malware class of the plurality of malware classes; and receiving, via the computing device, the confidence level associated with the deviation vector as an output of the classification model.

14. The computer program product of claim 10, wherein prior container behavior comprises instructions to further cause the computing device to perform:

recording operations of the container image based on the plurality of malware-related features for a period of time;

wherein the period of time terminates based on a determination of a lack of new operations.

15. A system for malware detection in containerized environments, said system comprising:

a computer system comprising, a processor, a computer readable storage medium, and program instructions stored on the computer readable storage medium being executable by the processor to cause the computer system to:

program instructions to monitor operation of a container image, the monitoring comprising receiving a plurality of system calls performed during the operation of the container image by accessing a plurality of file and process paths;

program instructions to compress offline the plurality of file and process paths into a profile based on a plurality of predefined parameters representing a plurality of malware classes;

program instructions to compare the plurality of system calls to prior container behavior associated with previous operation of a prior container image;

program instructions to identify a deviation from the prior container behavior; and program instructions to in response to identifying the deviation, isolate a subset of the plurality of system calls and classifying the subset to a malware class of the plurality of malware classes;

wherein program instructions to isolate the subset comprises a tree-structure analysis of the subset to detect a spawned malware based on an associate anomaly that is not a previously detected system call of the plurality of system calls performed during the operation of the container image and wherein the tree-structure analysis further comprises:

program instructions to filter the benign file and process paths of the plurality of file and process paths; and program instructions to aggregate the spawned malware into a deviation vector.

16. The system of claim 15, further comprising:

in response to identifying a confidence level included in the plurality of malware classes exceeding a pre-determined threshold, program instructions to generate an alert to notify of potential malware and at least one malware class of the plurality of malware classes.

17. The system of claim 15, wherein the program instructions to compare the plurality of system calls comprises:

program instructions to extract a plurality of malware-related features;

wherein program instructions to extract the plurality of malware-related features comprises:

program instructions to compress the plurality of system calls into the profile; and program instructions to filter the plurality of system calls for instances of malware based on the profile.

18. The system of claim 17, wherein the program instructions to extract the plurality of malware-related features comprises:

program instruction to generate a malware vector including the plurality of malware-related features;

wherein the vector is compared to the prior container behavior.

19. The system of claim 17, wherein prior container behavior comprises:

program instructions to record operations of the container image based on the plurality of malware-related features for a period of time;

wherein the period of time terminates based on a determination of a lack of new operations.

20. The system of claim 15, wherein the program instructions to isolate the subset of the plurality of system calls comprises:

program instructions to identify a plurality of processes relevant to the deviation;

program instructions to select a plurality of deviation related features derived from operations of the plurality of processes; and program instructions to transmit the deviation vector including the plurality of deviation related features to a classification model.

* * * * *